United States Patent [19]

Stiebel et al.

[11] Patent Number: 5,504,297
[45] Date of Patent: Apr. 2, 1996

[54] APPARATUS FOR ELECTRICAL RESISTANCE SPOT WELDING

[76] Inventors: Ariel Stiebel, 88 Marlborough, Bloomfield Hills, Mich. 48013; Wylie Chase, 4515 Motorway, Waterford, Mich. 48328; Chuck Beach, 6655 John R., Troy, Mich. 48098

[21] Appl. No.: 180,545

[22] Filed: Jan. 12, 1994

Related U.S. Application Data

[63] Continuation-in-part of Ser. No. 859,991, Mar. 30, 1992, abandoned.

[51] Int. Cl.$^6$ .............................. B23K 11/11; B23K 11/36
[52] U.S. Cl. ................. 219/89; 219/91.1; 92/15; 92/28
[58] Field of Search ..................... 219/89, 86.41, 219/86.51, 86.61, 91.1, 91.2; 92/18, 20

[56] References Cited

U.S. PATENT DOCUMENTS 3,889,094  6/1975  Needham .................. 219/89
4,861,959  8/1989  Cecil ........................ 219/89

Primary Examiner—Teresa J. Walberg
Assistant Examiner—J. Pelham
Attorney, Agent, or Firm—Gifford, Krass, Groh, Sprinkle, Patmore, Anderson & Citkowski

[57] ABSTRACT

An improved welding apparatus and method of use including a pair of opposed electrodes mounted on arms which are fixed against outward displacement during the application of the welding current. One of the arms includes a pneumatic cylinder for moving an electrode to and away from the work piece. The cylinder includes a piston rod attached to a clutch by a ball screw mechanism. A brake assembly is connected to the unidirectional clutch to prevent outward displacement of the electrodes during expansion of a weld nugget and permitting inward movement of the electrodes to provide indentation of the weld after the nugget softens.

6 Claims, 4 Drawing Sheets

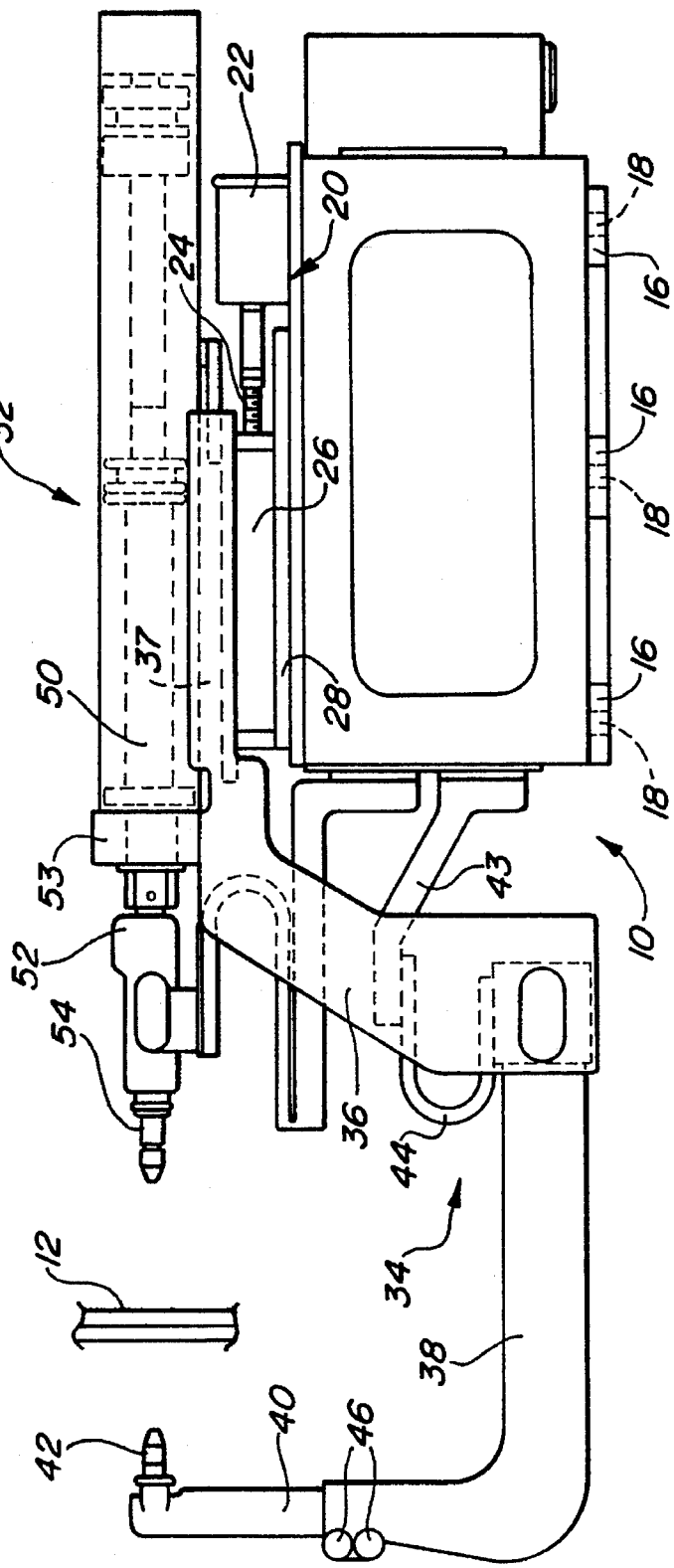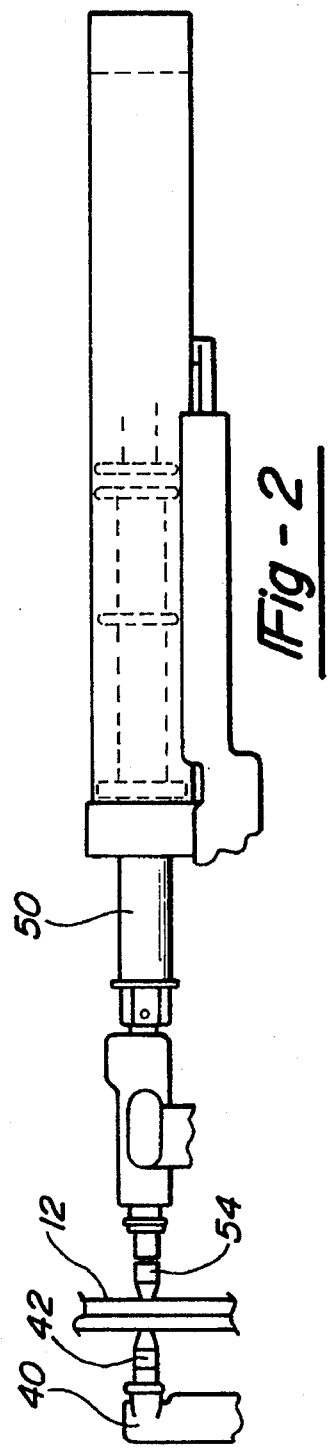

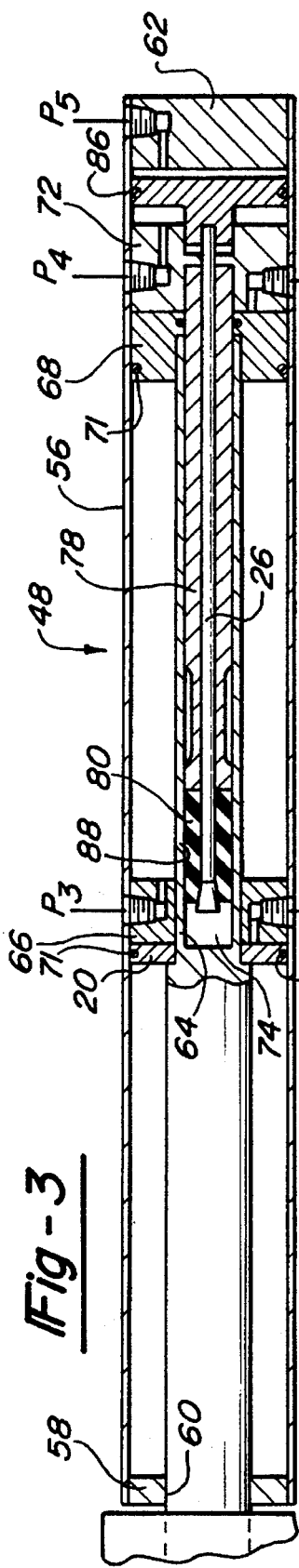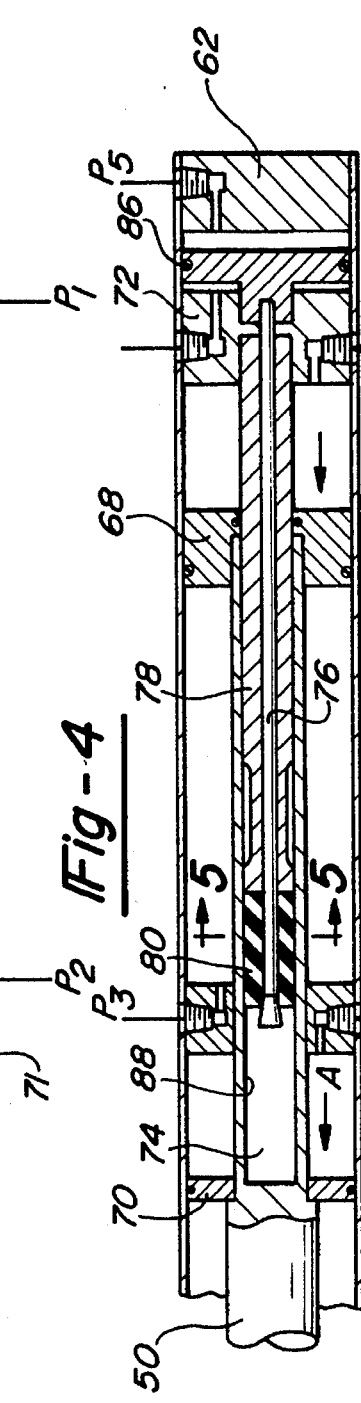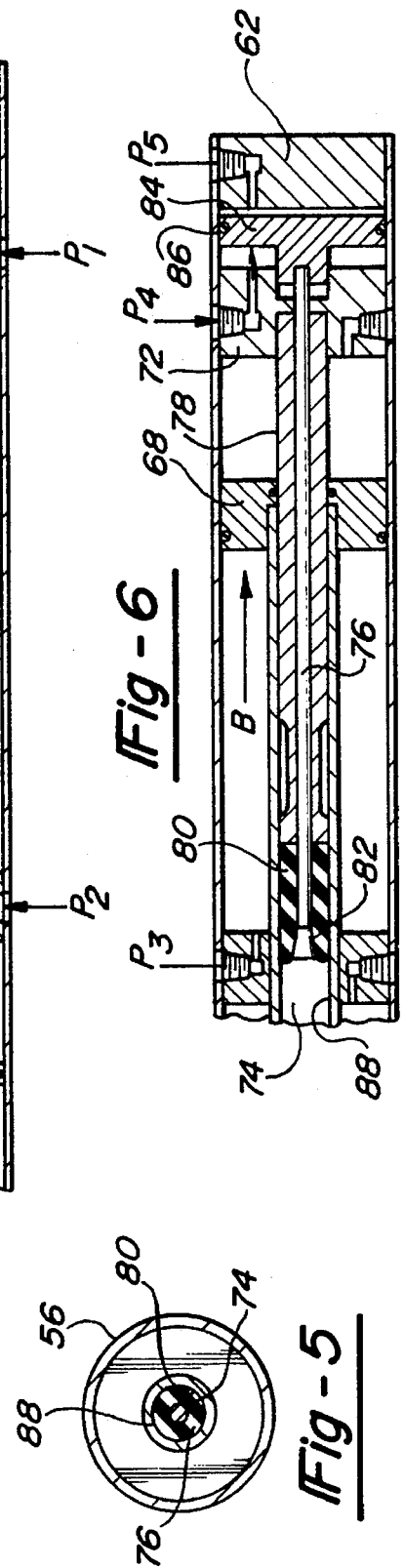

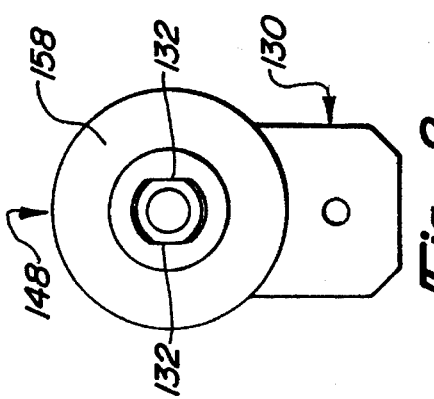
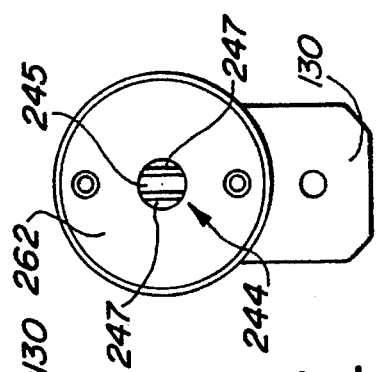
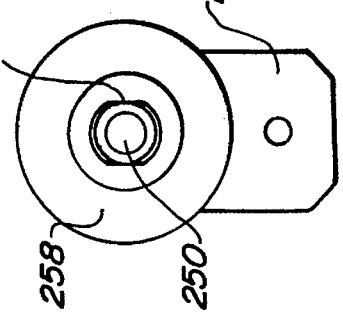
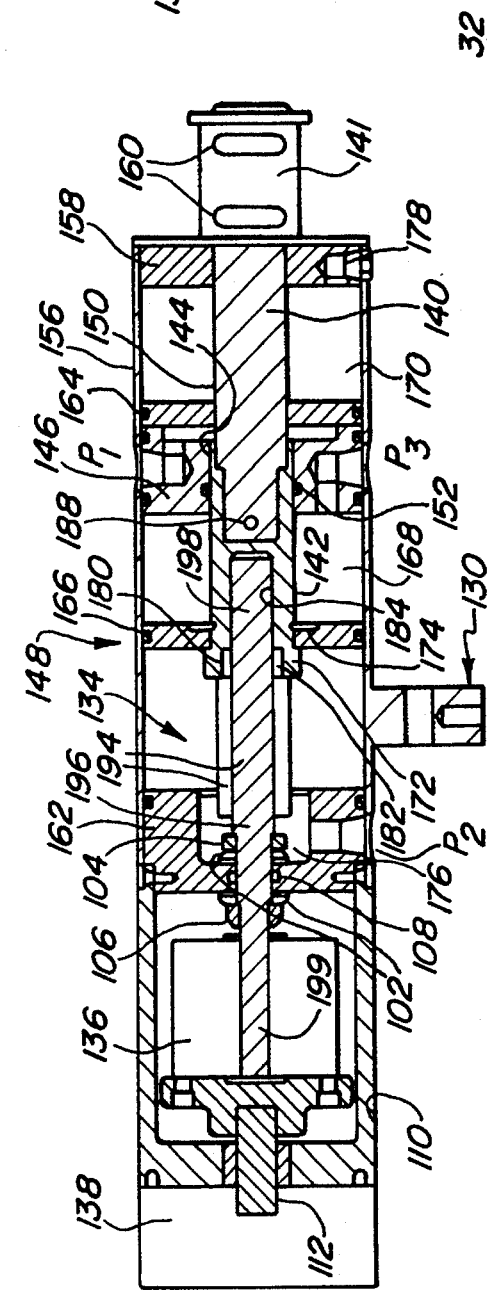
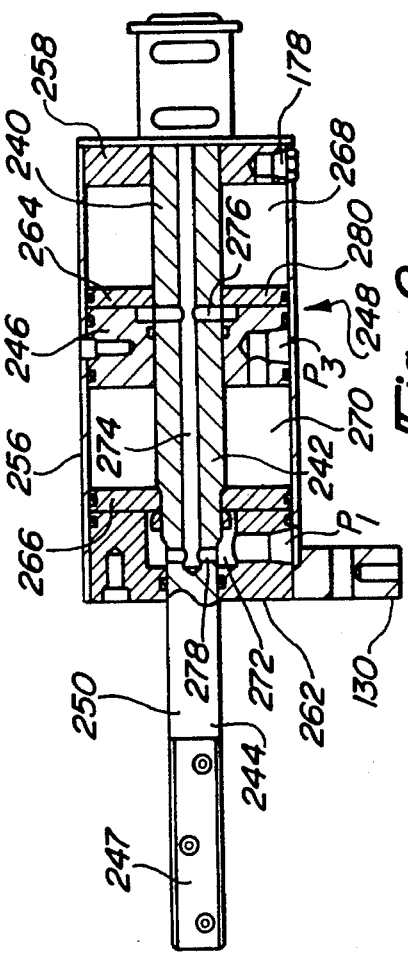

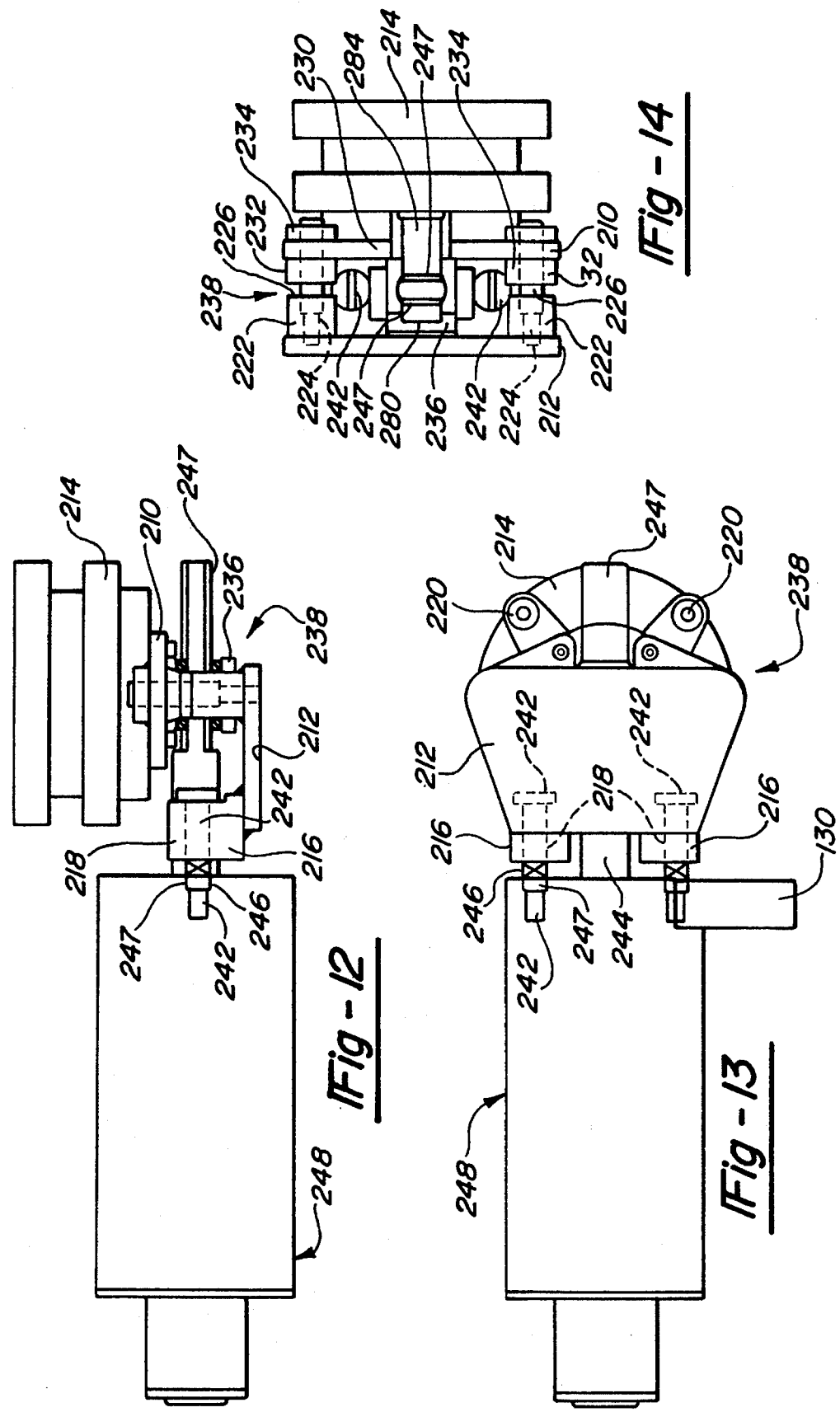

APPARATUS FOR ELECTRICAL RESISTANCE SPOT WELDING

BACKGROUND OF THE INVENTION

This is a continuation-in-part of application(s) Ser. No. 07/859,991, filed on Mar. 30, 1992, now abandoned.

FIELD OF THE INVENTION

Stiebel, U.S. Pat. No. 4,419,558 (Dec. 6, 1983) and A. Stiebel, C. Ulmer, D. Kodrack, B. Holmes, "Monitoring and Control of Spot Weld Operations," *SAE Technical Paper Series* No. 860579 (1986), Issue No. 148–7191 describe monitoring and controlling electrical resistance spot-welding by measuring displacements of the electrodes during welding. After the squeezing force is applied by the electrodes to the work pieces and the supply of welding current is initiated, the metal at the work site first expands thermally as it heats (expansion) and then flows plastically as it softens and fuses (indentation). The electrodes are displaced by the expansion and indentation of the metal at the weld site as well as by the expansion and contraction of the electrodes. Thus, measurements of the displacement of the electrodes during formation of the weld contain information indicative of the state of the metal at the weld site.

It has long been known that moderate indentation almost always ensures a good weld. The ability to measure the onset of indentation makes it possible, therefore, to shut off the welding current upon detection of indentation with a high level of assurance that a good weld has been formed. The Stiebel patent and the Stiebel et al technical paper referred to above are incorporated by the foregoing reference to them into the present specification.

In the method and apparatus of the Stiebel patent (and the Stiebel et al. technical article) consistent measurements of displacement are assured by interposing a mechanical compression spring between the piston of an air cylinder (or its equivalent) that moves the movable electrode into engagement with the work piece and a stationary electrode.

A load cell associated with the spring detects the changes in the load imposed on the spring as the movable electrode is displaced upon expansion and indentation of the metal of the work pieces at the weld site during formation of the weld. Compressing the spring during expansion provides changes in the resulting forces in the spring and thus on the load cells that are directly proportional to the displacement of the movable electrode. Without the spring, for example with a hydraulic or pneumatic cylinder directly working on the movable electrode, the piston is theoretically free to displace with the movable electrode in direct correspondence with the electrode movements, this providing no change in load and no opportunity to detect electrode displacements by detection of load changes.

SUMMARY OF THE INVENTION

It has been discovered that greatly improved welding characteristics may be had by fixing the electrodes in position against outward displacement when the metal work pieces expand during the application of welding current and permitting inward displacement of the electrodes after the softening of the metal nugget. Disclosed is a welding apparatus having a frame supporting a pair of arms having welding electrodes. At least one of the pair of arms is connected to a pneumatic cylinder operable for moving an electrode against a work piece and placing a squeezing force by the electrodes on the work piece.

Air pressure is supplied to the cylinder during the welding cycle to maintain the squeezing force on the work piece. The squeezing force is opposed by a counterforce of the metal work pieces.

The pneumatic cylinder includes a brake for preventing an outward displacement of electrodes during thermal expansion of the weld nugget. The brake includes a plurality of wedges which are disposed in an axial bore within the piston rod and movable outwardly to frictionally engage the inner surface of the axial bore of the piston rod.

The frictional force of the brake is controlled to be equal or slightly greater than the expansion force of the weld nugget to hold the cylinder against outward displacement during expansion of the weld nugget. However, after the metal softens, the counterforce of the metal is reduced so that the squeezing force is greater than the counterforce of the nugget and frictional force of the brake to permit the electrode to travel inwardly to form indentation.

A first alternative preferred embodiment of the invention is also disclosed. The first alternative embodiment includes a pneumatic cylinder having an electrically operated brake. A ball screw assembly connects a unidirectional clutch and a piston rod. The piston rod is connected to at least one of the electrodes. The brake assembly is operable with the unidirectional clutch to lock the electrodes against outward displacement during the weld cycle. However, the unidirectional clutch and ball screw assembly permit the piston rod and electrode to move inwardly after the metal of the work piece softens to cause indentation.

A second alternative embodiment is also disclosed. The second alternative embodiment includes a pneumatic cylinder having a piston rod having a working end extending from one end of the cylinder and a rod extension with friction pads extending from a cylinder cap on an opposite end of the cylinder. A brake assembly is movably mounted to the cylinder cap on a pair of pins. The brake assembly is spring-biased away from the cylinder. The brake assembly has self-centering apparatus provided to permit the brake assembly to frictionally engage the friction pads of the rod extension to lock the rod against outward movement during expansion of the weld nugget. The pins and springs permit inward movement of the piston rod and electrode after the metal of the work piece is softened.

The apparatus of the invention provides a weld with greatly improved welding characteristics. By locking the electrodes in position against expansion during the application of welding current, there is a reduction in sparking and resulting spark expulsion of the weld nugget. Additionally, the fixing of the electrodes against outward displacement results in increased pressure being applied to the weld nugget as a result of the expansion of the nugget during the application of the weld current. This increased pressure results in an improved weld. The apparatus also permits proper indentation of the nugget after softening of the metal.

Additionally, the apparatus is advantageously used in conjunction with piezoelectric strain gauges for controlling weld current, as disclosed in co-pending patent application Ser. No. 694,937, now U.S. Pat. No. 5,111,020.

DESCRIPTION OF THE DRAWING

The present invention will be more fully understood by reference to the detailed description of the preferred embodiments of the present invention when read in conjunction with the accompanying drawing, in which like reference characters refer to like parts throughout the views, and in which:

FIG. 1 is a side view of a welding apparatus in accordance with the invention shown in a retracted position;

FIG. 2 is a partial side view of the welding apparatus in accordance with the invention shown with an electrode arm in an extended position for welding;

FIG. 3 is a sectional view of a pneumatic cylinder with the piston in a retracted position;

FIG. 4 is a sectional view of a portion of the pneumatic cylinder with the piston in an extended position and a brake in an unlocked position;

FIG. 5 is a cross-sectional view of the pneumatic cylinder and brake taken along lines 5—5 of FIG. 4;

FIG. 6 is a sectional view of the pneumatic cylinder with the brake in a locked position; and FIG. 7 is a sectional view of a pneumatic cylinder in accordance with a first preferred embodiment of the invention;

FIG. 8 is an end view of the pneumatic cylinder and a piston rod in accordance with the invention;

FIG. 9 is a sectional view of a pneumatic cylinder in accordance with a second preferred embodiment of the invention;

FIG. 10 is an end view of a working end of the pneumatic cylinder in accordance with the second preferred embodiment of the invention;

FIG. 11 is an end view of an opposite end of the pneumatic cylinder in accordance with the second preferred embodiment of the invention;

FIG. 12 is a top view of the pneumatic cylinder and a brake assembly in accordance with the second preferred embodiment;

FIG. 13 is a side view of the pneumatic cylinder and a brake assembly in accordance with the second preferred embodiment; and FIG. 14 is an end view of the brake assembly in accordance with the second preferred embodiment.

DETAILED DESCRIPTION OF A PREFERRED EMBODIMENT

Shown in FIG. 1 is an embodiment of a welding apparatus 10 embodying the invention of a type for use in the welding of a work piece 12, by electrodes 42 and 54. The welding apparatus shown is particularly suitable for welding car and truck bodies. The welding apparatus 10 has a rigid frame 14 including flanges 16 extending along one side of the frame. Each flange 16 has a bore 18 for accepting a fastener to secure the frame to a robotic arm (not shown) which is used to position the welding apparatus. The frame may be secured to a machine or by an independent hanger.

Mounted to a top surface 20 of the frame 14 is a pressure equalizing device including a slide bar 26 an inner arm 32 and an outer arm 34 for use in balancing the pressure exerted on the work piece by the electrodes 42 and 54. The slide bar 26 is reciprocally movable on a pair of rails 28 along the top surface 20 of the frame 14. A biasing member 22 such as a spring or pneumatic cylinder, is connected by a threaded rod 24 to the slide bar 26 to force the slide bar in the direction of the work piece 12.

As shown in FIG. 1, the inner arm 32 and an outer arm 34 are fixedly mounted to the slide bar 26. The outer arm 34 includes a mounting bracket 36 having an elongated portion 37 mounted to the slide bar 26. Extending from a free end of the mounting bracket 36 is an L-shaped member 38 supporting a conventional electrode holder 40 and the electrode 42. Electrical current is delivered to the electrode 42 by conductive material disposed within the electrode holder 40 and L-shaped member 38. Electrical current is carried from a supply of electrical power carried at the frame by an extension bar 43 and wire 44. The wire 44 is flexible to facilitate movement of the outer arm 34. The electrode holder 40 is removable from the L-shaped member 38 by rotating threaded locking members 46.

As best shown in FIG. 1, the inner arm 32 includes a pneumatic cylinder 48 having a piston rod 50 supporting an electrode holder 52 and the electrode 54. The pneumatic cylinder 48 is bolted to elongated portion 37 of the mounting bracket 36.

When pressurized, the pneumatic cylinder 48 is operable to extend the piston rod 50 and the electrode 54 to contact the work piece 12. The cylinder is pressurized sufficiently to overcome the force of the biasing member 22, to move the slide bar away from the work piece and draw the electrode 42 to the work piece and place a predetermined squeezing force on the work piece. The squeezing force is sufficient to hold the electrodes firmly in contact with the work pieces but not so great as to deform the electrodes or work piece. The force varies according to the composition of the material of the work piece and electrodes. The slide bar and spring permit equalization of the pressure put on the sides of the work piece by the electrodes 42, 54.

As best shown in FIG. 3, the pneumatic cylinder 48 includes a cylinder barrel 56 having an end piece 58 at one end and a cap 62 at the opposite end. The piston rod 50 extends through a bore 60 in the end piece 58 and a bore 64 in a center port member 66 to a main piston 68. An auxiliary piston 70 is mounted to the piston rod to move within the barrel between the center port member 66 and end piece 58. The main piston 68 and auxiliary piston 70 each have annular grooves containing O-rings 71 to provide a seal with the interior surface of the barrel 56.

A primary port member 72 is mounted between the center port member and cap. The primary port member 72 has a forward stroke port $P_1$ and the center port member has a forward stroke port $P_2$. The forward stroke ports ($P_1$ and $P_2$) are connected to a source of pressurized fluid, such as compressed air (not shown). When compressed air is introduced into the cylinder through $P_1$ and $P_2$, the main piston 68 and auxiliary piston 70 are forced to move the piston rod and electrode 54 in a direction shown by Arrow A in FIG. 4 forward towards the work piece 12. The center port member 66 has a port $P_3$ for introduction of pressurized air into the barrel to act on the main piston 68 to return the piston rod 50 from the work piece in a direction shown by Arrow B of FIG. 6.

As shown in FIGS. 3, 4 and 6, the piston rod 50 has an axial bore 74 extending from the end piston 68 to the center piston 70. Disposed within the bore 74 is a brake rod 76 supporting a cylindrical spacer 78 and brake wedges 80 for mechanically locking the piston rod in position. One end of the spacer 78 is fixedly mounted within a bore of the primary port member 72. An axial throughbore extends through the spacer 78 and primary port member 72 and brake wedges 80 for slidingly accepting the brake rod 76.

A frusto-conical mandrel 82 is attached at one end of the brake rod adjacent the brake wedges 80. A brake piston 84 is attached to the opposite end of the brake rod 76. The brake piston 84 is disposed in the cylinder barrel between the primary port member 72 and cap 62 and has an O-ring 86 disposed in an annular groove, as best shown in FIGS. 5 and 6. The brake piston 84 is displaceably away from the primary port member 72 by compressed air received through port $P_4$. Movement of the brake piston 84 away from the primary port member 72 results in the movement of the piston rod and brake mandrel 82 in the direction shown by Arrow B inwardly against the brake wedges 80. As the brake mandrel moves inwardly, the brake wedges 80 are forced radially outward by the brake cap against an interior cylindrical surface 88 of the bore of the piston rod, balancing the frictional force of the brake against the expansion force of the work piece.

Each brake wedge is formed of a suitable rigid heat resistant material which is used in automotive brake linings. The brake wedges have a cylindrical outer surface having a circumference slightly smaller than the interior surface 88 of its base.

The force of the brake wedges on the cylindrical surface of the bore is a predetermined frictional force equal to or slightly greater than the force of expansion created by the metal as it is being heated by the welding current. Thus, the frictional force holds the electrode against outward displacement during the expansion of the work piece. However, once the metal softens and the counterforce of the work piece to the squeezing force of the electrodes is reduced, the squeezing force overcomes the frictional force and reduces counterforce to permit the piston rod 50 and electrode 54 to move inwardly. The pressure equalizing device permits electrode 54 to indent the work piece after the metal softens, thus producing a weld of superior quality and consistency.

The brake wedges are released by introducing pressurized air through port $P_5$ to act against the brake piston 84 to move the brake rod 76 and brake mandrel 82 in a direction away from the brake wedges shown by Arrow A of FIG. 4. The biasing member 22 moves the slide bar to return the electrodes to the starting position.

A first preferred alternative embodiment of a pneumatic cylinder 148 for use in a welding apparatus 10 is shown in FIGS. 7 and 8. The cylinder 148 includes a ball screw assembly 134, a unidirectional clutch 136 and a brake assembly 138. The pneumatic cylinder 148 is mounted to the mounting bracket 36 of the pressure equalizing device as described above (FIG. 1) by bolts (not shown) which engage a flange 130.

As best shown in FIG. 7 the pneumatic cylinder 148 includes a cylinder barrel 156 mounted to an end piece 158 and a cylinder cap 162. The piston rod 150 is reciprocally movable through an aperture in the end piece 158. The piston rod has a working end portion 140 and inner end portion 142. As shown in FIG. 8, the working end portion 140 has a pair of flat surfaces 132 which mate with corresponding surfaces of the aperture of the end piece to hold the rod 150 in alignment as it moves. The working end 140 has a mount 141 with slots 160 for mounting of the electrode holder 52 for supporting the electrode 54 in the same manner as discussed above. The inner end portion 142 which may be separately formed and threadably attached to the working end portion 140. A roll pin 188 is used to lock the inner end portion to the rod 150. The inner end portion 142 includes a flange 172 and stepped axial bore 180. The piston rod 150 is supported within the barrel 156 in an axial bore 144 in a cylinder head 146. The bore 144 has an O-ring 152 in a slot to provide a seal.

An inner cylinder head 164 and an outer cylinder head 166 are mounted to the rod. The inner piston head 164 moves in a first chamber 168 between the end piece 158 and cylinder head 146. The outer piston head 166 moves in the second chamber 170 formed between the cylinder head 146 and the cap 162. The outer piston head 166 is held in position on the piston between the flange 172 on the inner end portion 142 of the rod and a retaining ring 174 mounted in a circumferential slot formed on the rod.

A forward stroke port $P_1$ opens into an annular passageway 174 to introduce pressurized air to act on the inner piston head 164. A second forward stroke port $P_2$ is provided in the cylinder cap 162 having a passage 176 for introducing pressurized air into the second chamber 170 to act on the outer piston head 166 to extend the rod. Pressurized air is supplied to both $P_1$ and $P_2$ at the same time to extend the rod. A return port $P_3$ is positioned in the cylinder head 146 to permit pressurized air to be introduced into the second chamber 170 to move the outer piston head 166 away from the cylinder head 146 to actuate a return stroke. A breather 178 is mounted in the end piece 188 to permit introduction and expansion of ambient air into a non-working portion of the cylinder.

The ball screw assembly 134 includes a ball screw nut 194 and a ball screw rod 196. The ball screw nut is threadably attached to an outer threaded portion 182 of the axial bore 180 of the inner rod. The ball screw rod 196 has a threaded end portion 198 and a smooth end portion 199. The threaded end portion 198 is threadably received within a threaded bore of the ball screw nut 194 and an inner threaded portion 184 of the axial bore 180.

The ball screw rod 196 is supported for rotation within the cylinder cap 162 by a thrust bearing assembly, including two needle thrust bearing packages 102. One thrust bearing 102 is mounted between a collar 104 on the ball screw rod 196. The other is mounted between the end cap 162 and a bear hug nut 106. The needle thrust bearing assembly is advantageously provided to permit the ball screw rod 196 to rotate freely within the cap 162 and absorb the axial thrust which occurs as the result of the movement of the rod 150. An O-ring 108 is disposed in the cylinder cap about the ball screw rod 196 to seal the cylinder.

The unidirectional clutch assembly 136 is mounted to the smooth end portion 199 of the ball screw rod 196 within a cylinder housing 110 which is fixedly mounted to the cylinder cap 162. The unidirectional clutch assembly 136 may be of any conventional type, such as Model FSO 300 manufactured by Warner Brake. The unidirectional clutch assembly 136 permits rotation of the ball screw rod 196 in one direction only when the clutch assembly is held against rotation by the brake assembly 138. The brake assembly 138 is of any conventional type, such as produced by Warner Brake, and is mounted to engage a brake rod 112 extending from the unidirectional clutch assembly. The brake rod 112 is mounted in a needle bearing 114. The electric brake assembly 138 has brake shoes (not shown) which are biased into engagement with the brake rod 112 to prevent rotation of the unidirectional clutch assembly 136. Because the rod 150 is held against rotation by the flat surfaces 132, the ball screw rotates in a first direction, for instance, clockwise, when the rod 150 is extended outwardly and rotates in an opposite direction, for instance, counterclockwise, when the rod 150 is returned.

When the electric brake assembly 138 is energized, the ball screw rod 126 is free to rotate in either direction to move the rod 150. However, when the electric brake assembly 138 is deenergized, the brake rod 112 and unidirectional clutch assembly 136 are locked against rotation. The unidirectional clutch assembly then is selectively operable to permit the ball screw rod 196 and piston rod to move in only one direction.

Thus, the first preferred alternative embodiment of the cylinder 148 advantageously locks the rod 150 and electrodes from outward displacement during expansion of the weld nugget. The pneumatic cylinder applies a squeezing force in the same manner as disclosed above. When the brake assembly 138 is energized, the rod 150 and electrodes 42 and 54 are locked against outward movement during expansion of the work piece. However, the squeezing force which is applied through ports $P_1$ and $P_2$ to force the electrodes together against the work piece is sufficient to move the electrodes together after the metal softens and the counterforce is overcome. The inward movement of the electrode is permitted by the ball screw assembly and unidirectional clutch assembly. Thus, the first preferred embodiment does not require balancing the frictional force with the expansion force as disclosed above to permit a precise control of the movement of the electrodes during the welding cycle.

A second preferred embodiment of a pneumatic cylinder 248 with a caliper assembly is shown in FIGS. 9, 10, 11, 12, 13 and 14. As shown in FIG. 9, the pneumatic cylinder 248 has a cylinder barrel 256 enclosed by an end piece 258 and a cap 262. The pneumatic cylinder 248 has a reciprocally mounted rod 250. The rod has an intermediate portion 242 extending between a working end 240 and a rod extension 244. The working end 240 is formed as discussed above for the first preferred embodiment.

As shown in FIGS. 9 and 11, the rod extension 244 has a pair of spaced apart flat surfaces 245 having friction members 247 mounted thereto. The end piece 258 and cap 262 have apertures formed to permit reciprocal movement of the rod 250. A flange 130 extends from the cylinder cap 262 for mounting to the mounting bracket 36 (as discussed above).

A cylinder head 246 is mounted in the cylinder 248 to form a first chamber 268 and a second chamber 270. An inner piston 264 is mounted to the rod 250 in the first chamber 268 and an outer piston 266 is mounted in the second chamber 270. The cap 262 has a port $P_1$ communicating by way of a passageway 272 with a radial bore 278 in the rod 250. The rod 250 has an axial bore 274 extending from the radial bore 278 to a second radial bore 276 disposed adjacent the inner piston 264. Pressurized air enters port $P_1$ to extend the rod 250. The pressurized air is delivered into the passageway 272 to act on the outer piston head 266 and through the radial bores 278, 276 and axial bore 274 of the rod to a passageway 280 formed in the cylinder head 246 to act on the inner piston 264 and thereby extend the rod 250. Port $P_3$ is formed in the cylinder head 246 to deliver air into the second chamber 270 to act on the outer piston 266 to retract the piston 250. A breather 178 is mounted in the end cap to permit introduction and expulsion of ambient air from a nonworking portion of the first chamber.

A caliper assembly 238 is shown in FIGS. 12, 13, and 14. As shown in FIGS. 12 and 13, a caliper assembly 238 is mounted to the cylinder cap 262 of the cylinder by a pair of threaded bolts 242. The caliper assembly 238 includes an inner plate 210, an outer plate 212 and an actuator 214. The outer plate 212 has a pair of blocks 216. Each block 216 has a bore 218 to accept one of the pins 242 and a bushing 220. Disposed on each bolt 242 is a spring 246 and bushing 247 between the cylinder cap 262 and blocks 216 to bias the assembly 238 away from the cylinder cap 262. As shown in FIG. 14, the outer plate 212 has two spacers 222 mounted on an inner side. The spacers 222 include a pair of bores 224 for accepting pins 226 for mounting the outer plate to the inner plate 210. The inner plate 210 is generally planar, having a center opening 230 and a pair of cylindrical mounts 232 with throughbores 234 disposed to accept the pins 226. The inner and outer plates are disposed on either side of the rod extension 244 and friction members 247. A U-shaped support member 236 is welded to the inner plate 210 to extend over the center opening 230 between the inner and outer plate and around the rod extension 244. A friction plate 280 is mounted in the center of the support member 286 parallel and spaced apart from the friction member 247 of the rod 244. As shown in FIG. 14, the actuator 214 is a pneumatic cylinder having an actuator rod 284. The actuator 214 is mounted by screws 220 to the inner plate. The actuator rod is disposed to be directed into the center opening 230 of the inner plate towards one of the friction plates 247.

As shown in FIG. 14, the friction members 247 are disposed between the friction plate 280 and actuator rod 284 of the brake cylinder which are advantageously all formed of the same material. Thus, when the actuator rod 284 is extended, it contacts the friction plate 247 of the extension rod 244 and draws the friction plate of the inner plate against the opposite side of the extension rod 244 by pushing against the rod 244 like a caliper. In this way, the rod and electrodes are held against outward displacement during the expansion of the work piece. However, the brake assembly is free to move inwardly on the bolts 242 to indent the weld nugget after expansion when the squeezing force of the electrodes overcomes the counterforce of the metal work piece and the brake assembly then moves inwardly by compressing the springs 246 on the bolts 242.

The method of operation of the improved welding apparatus according to the invention includes first positioning the electrodes 42 and 54 on either side of the work piece 14, as best shown in FIG. 1. As shown in FIG. 2 and FIG. 4, pressurized air is introduced into ports $P_1$ and $P_2$ to extend the piston rod 50 and electrode 54 against the work piece. The pressure of the electrode 54 on the work piece forces the outer arm to slide inwardly, drawing electrode 42 against the biasing member to abut the work piece as shown in FIG. 2. The pressure of the electrodes on either side of the work piece is equalized by movement of the slide bar against the biasing force of the spring. When sufficient pressure, for instance, 800 lbs/sq. in., to squeeze the work piece between the electrodes. The brake is applied to prevent separation of the electrodes during expansion of the work piece. The brake wedges are set by introducing pressurized air through $P_4$, thereby forcing the brake wedges apart against the inner surface of the piston rod bore to mechanically lock the piston rod in position. The welding current is then applied to form a weld nugget. After the nugget has been formed, the current is terminated and the brake is released.

Because an important aspect of the invention is preventing outward displacement of the electrodes during the application of weld current, it is within the contemplation of the invention to adjust the pressure setting the brake at a level which will permit the squeezing force of the cylinder to move the electrodes together after expansion of the weld nugget. Thus, the electrodes are free to move inwardly firmly contacting the weld during contraction of the nugget as it cools.

After the weld has cooled, the electrodes are moved apart and the work piece removed to complete the cycle.

It has been found that locking the piston rod reduces spark expulsion and the increased pressure which results from the expansion of the weld nugget during the application of the weld current results in a much improved weld over previous methods.

It should be clear that variations of the invention may be made without departing from the scope and spirit of the invention. For instance, it is not necessary to have a double piston arrangement as disclosed. Likewise, many variations in the manner in which the electrodes are fixed against outward expansion during the application of the welding current are within the scope of the invention.

We claim:

1. An improved welding apparatus for welding a metal-work piece comprising:

a frame;

at least one of a pair of electrodes being movably mounted to said frame;

a cylinder having a reciprocally movable piston rod for moving said at least one of said pair of electrodes to and away from said work piece;

a brake device mounted to said cylinder and being selectively operable between a locked position and an unlocked position, said brake device preventing displacement of said electrodes from a predetermined position where said electrodes are in contact with said work piece during expansion of said work piece when in said locked position, said brake device having means for permitting inward axial movement of at least one of said electrodes from said predetermined position when said brake device is in said locked position and said metal work piece softens, said brake device further having means for movably mounting said brake device to said cylinder, said means for mounting permitting movement of said brake device in an axial direction.

2. The welding apparatus of claim 1, wherein said braking device further comprises at least one biasing member mounted to urge said brake member in an axial direction away from said cylinder.

3. The welding apparatus of claim 2, further comprising a rod extension connected to said piston rod and disposed of contact with said brake device.

4. The welding apparatus of claim 3, wherein said brake device includes at least one contact member positioned for frictionally engaging said rod extension.

5. The welding apparatus of claim 4, wherein said rod extension has at least one friction member positioned for contact with said at least one contact member.

6. The welding apparatus of claim 5, wherein said at least one friction member and said at least one contact member are formed of the same material.

* * * * *

UNITED STATES PATENT AND TRADEMARK OFFICE
CERTIFICATE OF CORRECTION

PATENT NO. : 5,504,297
DATED : April 2, 1996
INVENTOR(S) : Stiebel et al.

It is certified that error appears in the above-indentified patent and that said Letters Patent is hereby corrected as shown below:

Column 10, line 14, claim 3, delete "of" and insert --for--.

Signed and Sealed this

Second Day of July, 1996

Attest:

BRUCE LEHMAN

Attesting Officer

Commissioner of Patents and Trademarks